May 13, 1969  MICHIO KUMAZAWA  3,443,351

DEVICE FOR FITTING FENDERS TO STRUCTURES AND THE LIKE

Filed June 19, 1967

INVENTOR.
MICHIO KUMAZAWA,
BY Linton and Linton
ATTORNEYS.

United States Patent Office 3,443,351
Patented May 13, 1969

3,443,351
DEVICE FOR FITTING FENDERS TO STRUCTURES
AND THE LIKE
Michio Kumazawa, Yamato-machi, Kitaodachi-gun,
Saitama Prefecture, Japan, assignor to Seibu Gomu
Kagaku Kabushiki Kaisha (trade name: Seibu
Rubber Chemical Co., Ltd.), Tokyo, Japan, a corporation of Japan
Filed June 19, 1967, Ser. No. 647,003
Claims priority, application Japan, Sept. 6, 1966,
41/83,596
Int. Cl. E04b 1/38
U.S. Cl. 52—704        2 Claims

ABSTRACT OF THE DISCLOSURE

The present device is for connecting fenders to a structure and is more particularly concerned with a device for fitting fenders to structures and the like having a resilient plug insertable in a structure opening to which a fender can be connected by a bolt.

Object of the invention

An object of the present invention is to provide a durable device for fitting fenders to a structure and which will provide a secure fastening device in which screw bolts for fixing the fenders will remain tight and stable for a long period.

Description

The details of the invention will be described with reference to the attached drawings in which.

Figure 1:
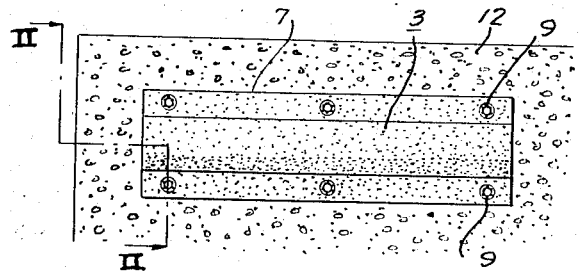
FIG. 1 is a side elevation showing a fender fitted to a quay-wall by means of a fastening device according to the invention.
Figure 3:
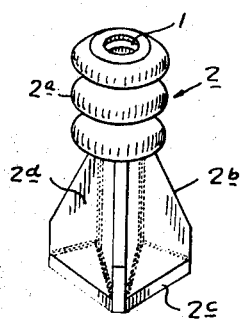
FIG. 3 is a perspective view of a plug used in the present invention.
Figure 2:
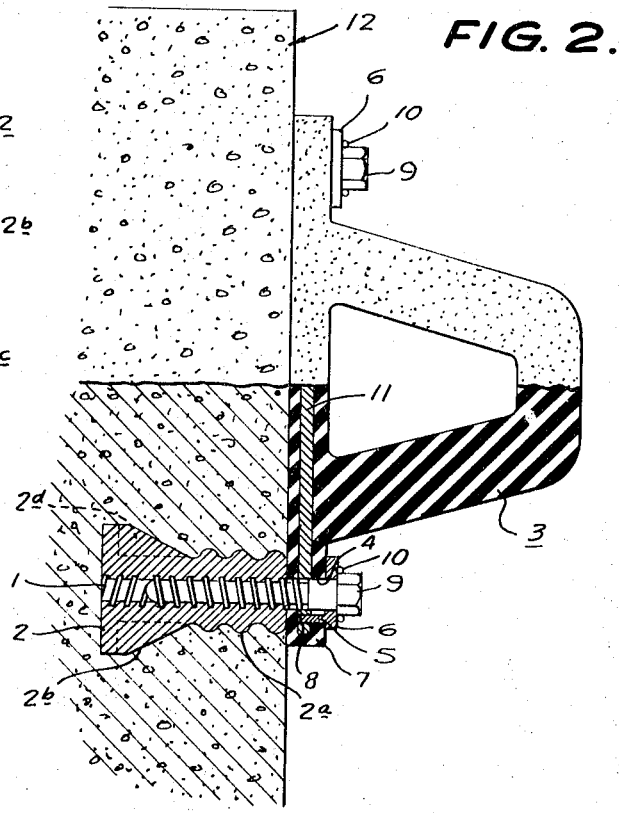
FIG. 2 is an enlarged cross-section taken along line II—II of FIG. 1.

Referring now more particularly to the accompanying drawings, wherein like and corresponding parts are indicated by similar reference characters, 2 designates a plug which is made of synthetic resin or other resilient substance which is both chemical-proof and weatherproof, has a threaded bore 1 and its outside is irregular in shape. In the example shown in the drawing, the outside of said plug has circular ridges or threads 2a at the top and at the bottom it is composed of four axially extending radial triangle wall plates 2b slanting toward the axis and four bottom plates 2c at right angles to the axis, thereby forming four recesses 2d between them.

In use, said plugs 2 are buried at appropriate positions in openings in structures such as, for example, quay-wall 12, with the hole 1 held vertical to the plane of said quay-wall 12.

Fitting openings 4 are provided through the flanges 7 of the fender 3 made of rubber or other elastic substances to be set opposite to the top end of said plugs. Then attached washer 6 with a pin 5 is positioned on the outside of each flange 7 and said pin 5 is inserted into an anti-turning opening 8 preliminarily provided in the flange 7 of the fender. Said opening 8 is positioned near said opening 4 and said hole 8 penetrates the outer layer of rubber of the flange to the core board 11 embedded in the fender.

The fixing of the fender is completed when bolts 9 are inserted successively through the center holes of said washers 6 and the fitting openings 4 in the flanges 7 of the fenders 3 and are screwed into the holes 1 of said embedded plugs 2.

The present arrangement an antiturning opening 8 is provided outside of the fitting opening 4 in each flange 7 said antiturning opening 8 and then bolt 9 fastens through fender 3 to embedded plug 2, so that repeated shocks at of the fender 3 while pin 5 of washer 6 is inserted into the time a ship abuts said fender during mooring cannot turn the washer. Thus, with its relative position being held stable, there is no likelihood of the bolt 9 being turned in reverse and loosened.

If, as indicated in the figure, the head of each bolt 9 and its washer 6 were welded together, the effect would be farther improved.

Being made of synthetic resin or the like, the embedded plugs 2 permit easy unbolting of the fenders 3, for the exchange of fenders, at times of disuse, and said plugs can be filled with other appropriate bolts and can remain ready for use anytime, as said plugs 2 have irregular outside surfaces, they will never be detached off the quaywall once they are buried.

The present invention is capable of considerable modifications, and such changes thereto as come within the scope of the appended claims is deemed to be a part thereof.

I claim:
1. A device for fitting a fender to a fixed structure, said device comprising a fender made of an elastic substance and having a flange, a core board embedded in said flange, a fitting opening provided in said flange, and antiturning opening provided in said flange adjacent said fitting opening, said antiturning opening extenting from the exterior of said flane to at least said core board, a washer including a pin inserted into said antiturning opening, a plug to be embedded in a fixed structure, said plug having an irregular outside surface and an axial threaded bore, and a bolt extending through said fitting opening and said washer of said fender and being in threaded engagement with said thread bore of said plug.

2. A device as claimed in claim 1, in which said plug with an irregular outside surface, has a plurality of triangular wall plates extending radially around said plug from a part thereof, and a plurality of bottom plates extending at right angles to the axis core of said plug and connecting bottoms of said triangular wall plates, thereby forming wedgeshaped recesses between them.

References Cited

UNITED STATES PATENTS

| 1,185,765 | 6/1916 | Brooks | 52—699 XR |
| 1,260,331 | 3/1918 | Collings | 52—710 XR |
| 3,248,184 | 4/1966 | Osborn et al. | 52—704 XR |

BOBBY R. GAY, *Primary Examiner.*

ANDREW M. CALVERT, *Assistant Examiner.*